United States Patent [19]

Canale et al.

[11] Patent Number: 5,619,648

[45] Date of Patent: Apr. 8, 1997

[54] MESSAGE FILTERING TECHNIQUES

[75] Inventors: Leonard M. Canale, Tinton Falls; Henry A. Kautz, Summit; Allen E. Milewski, Red Bank; Bart Selman, Summit, all of N.J.

[73] Assignee: Lucent Technologies Inc., Murray Hill, N.J.

[21] Appl. No.: 346,715

[22] Filed: Nov. 30, 1994

[51] Int. Cl.$^6$ ............................................. G06F 17/20
[52] U.S. Cl. ................................. 395/200.01; 395/650
[58] Field of Search ................................. 395/650, 700, 395/200.08, 200.01

[56] References Cited

U.S. PATENT DOCUMENTS 5,093,918  3/1992  Heyen et al. ................ 395/200.08
5,377,354  12/1994  Scannell et al. .................... 395/650

OTHER PUBLICATIONS

P. W. Foltz, S. T. Dumais, "Personalized information delivery: An Analysis of Information Filtering Methods", Communications of the ACM, vol. 35, No. 12, Dec. 1992, pp. 51–60.

D.K. Gifford, R. W. Baldwin, S. T. Berlin, J. M. Lucassen, "An Architecture for Large Scale Information Systems", Proceedings Tenth Symposium on Operating Systems Principles, ACM, Dec. 1985, pp. 161–170.

E. Lutz, H. V. Kleist-Retzow and K. Hoernig, "MAFIA—An Active Mail-Filter-Agent for an Intelligent Document Processing Support", Multi-User Interfacws and Applications, S. Gibbs and A. A. Verrign-Stuart, Eds. North Holland, 1990, pp. 235–251.

T. W. Malone, K. R. Grant, F. A. Turbak, S. A. Brobst, M. D. Cohen, "Intelligent Information–Sharing Systems", Communications of the ACM, May 1987, vol. 30, No. 5, pp. 390–402

S. Pollack, "A Rule–Based Message Fultering System", ACM Trans. on Office Information Systems, vol. 6, No. 3, Jul. 1988, pp. 232–254.

P. Maes, "Agents that Reduce Work and Information Overload", Communications of the ACM, vol. 37, No. 7, Jul. 1994, pp. 31–40.

Primary Examiner—Glenn A. Auve
Attorney, Agent, or Firm—Gordon E. Nelson; David Volejnicek

[57] ABSTRACT

Techniques for reducing the amount of junk e-mail received by a user of an e-mail system. A recipient description containing non-address information is added to an e-mail message. The user has an e-mail filter which has access to information which provides a model of the user. The e-mail filter uses the non-address information and the model information to determine whether the e-mail message should be provided to the user. The e-mail filter further has access to information which provides models of the user's correspondents. If the filter does not provide the message to the user, it uses the non-address information and the model information of the user's correspondents to determine who the message might be forwarded to. A sender of e-mail can also use the model information of the sender's correspondents together with the non-address information to determine who the message should be sent to. The techniques are used in a system for locating expertise.

16 Claims, 2 Drawing Sheets

MESSAGE FILTERING TECHNIQUES

BACKGROUND OF THE INVENTION

1. Field of the Invention

The invention concerns electronic messaging in general and electronic mail in particular.

2. Description of the Prior Art

A major annoyance in the conventional mail system is junk mail. As electronic mail has grown in availability and popularity, junk electronic mail has become a problem as well. Indeed, the ease with which an e-mail message may be sent to many recipients may eventually make junk e-mail an even worse problem that junk conventional mail.

The prior art has attempted to deal with the junk e-mail problem by means of mail filters in an e-mail recipient's local e-mail system. Such a filter sorts incoming e-mail for the recipient into categories determined by the recipient. The filter simply scans each e-mail message as it reaches the recipient and determines what category it should be placed in. One category is of course "discard". Messages which the filter places in that category are automatically discarded. Prior-art filters have had varying degrees of intelligence; some have simply worked with lists of source addresses and have sorted according to the source of the message; others have used keywords provided by the recipient to sort; with others, finally, the filter observes how the recipient sorts his e-mail for awhile and is then able to sort in a similar fashion. For details about mail filters, see Peter W. Foltz and Susan T. Dumais, "Personalized information delivery: an analysis of information filtering methods", *Communications of the ACM*, vol. 35, no. 12, Dec., 1992, pp. 51–60; D. K. Gifford, R. W. Baldwin, S. T. Berlin, J. M. Lucassen, "An architecture for large scale information systems", in *Proceedings Tenth Symposium on Operating Systems Principles*, (Orcas Island, Wash., Dec 1985), pp. 161–170; E. Lutz, H. V. Kleist-Retzow, and K. Hoerning, "MAFIA—An active mail-filter agent for an intelligent document processing support", in *Multi-User Interfaces and Applications*, S. Gibbs andn A. A. Verrijn-Stuart, Eds, North Holland, 1990, pp. 16–32; T. W. Malone, K. R. Grant, F. A. Turbak, S. A. Browst, M. D. Cohen, "Intelligent information sharing systems", *Commun. ACM* 30, 5 (May 1987) 390–402; S. Pollack, "A rule-based message filtering system", *ACM Trans. Off. Inf. Syst.* 6, 3 (July 1988), 232–254. P. Maes, "Agents that Reduce Work and Information Overload", *Commun. ACM* 37 (7) (July 1994), pp. 31–40. A problem with all such filters is that sorting for another person is difficult even for a human being, and if a filter is going to be useful, it cannot do much worse than a human would.

One of the reasons for the junk mail is that present-day e-mail systems require that recipients be addressed by e-mail addresses. In order to ensure that an e-mail message will reach everyone who might possibly be interested in it, the sender typically uses a list of addresses which includes those who might be interested but includes many others as well. For everyone but those actually interested, the e-mail is of course junk mail.

What is needed to reduce the amount of junk mail is a technique which permits a sender to use something in addition to the e-mail address to specify the kinds of people who are to actually receive the e-mail and permits a filter to use the information provided by the sender to filter the mail so that only those kinds of people actually receive it. It is an object of the invention disclosed herein to provide such a technique and thereby to reduce the amount of junk e-mail received by a user of the e-mail system.

SUMMARY OF THE INVENTION

The invention reduces the amount of junk e-mail received by a user of the e-mail system by adding a recipient specifier to an e-mail message. The recipient specifier non-address information is used to further specify the recipients in the group to whom the message is sent who should actually receive the message. The mail filter for a given recipient has access to information about that recipient and uses that information together with the non-address information in the e-mail message to determine whether the message should be provided to the given recipient. If the non-address information and the information about the recipient indicate that the given recipient should not receive the message, the filter does not provide it.

In another aspect of the invention, the sender's mail filter does the filtering. The sender provides a recipient specifier which uses non-address information to specify potential recipients to the mail filter. In this aspect, however, the sender's mail filter has access to information about the possible recipients and uses this information together with the non-address information to determine the potential recipients to whom the message should be sent.

The first and second aspects of the invention are combined in a further aspect of the invention, namely a system for locating expertise in the e-mail system. In this system, the sender specifies an area of expertise by means of a list of keywords which are relevant to the area. The list of keywords is included in a recipient specifier in the message. The mail filter for a potential recipient has access to the document files of the potential recipient and to a list of the e-mail messages sent and received by the potential recipient. The mail filter uses the document files to determine the recipient's areas of expertise. If the keywords in the recipient specifier match one of the areas of expertise, the mail filter provides the e-mail message to the potential recipient; if not, the mail filter uses the list of e-mail messages to determine correspondents of the the potential recipient who may have the area of expertise specified in the recipient specifier and forwards the message to those correspondents. The mail filter of each potential recipient which actually provides the message to the recipient further sends a referral message to the sender of the message, who thus knows exactly who received the message.

Other objects and advantages of the apparatus and methods disclosed herein will be apparent to those of ordinary skill in the art upon perusal of the following Drawing and Detailed Description, wherein:

Figure 2:
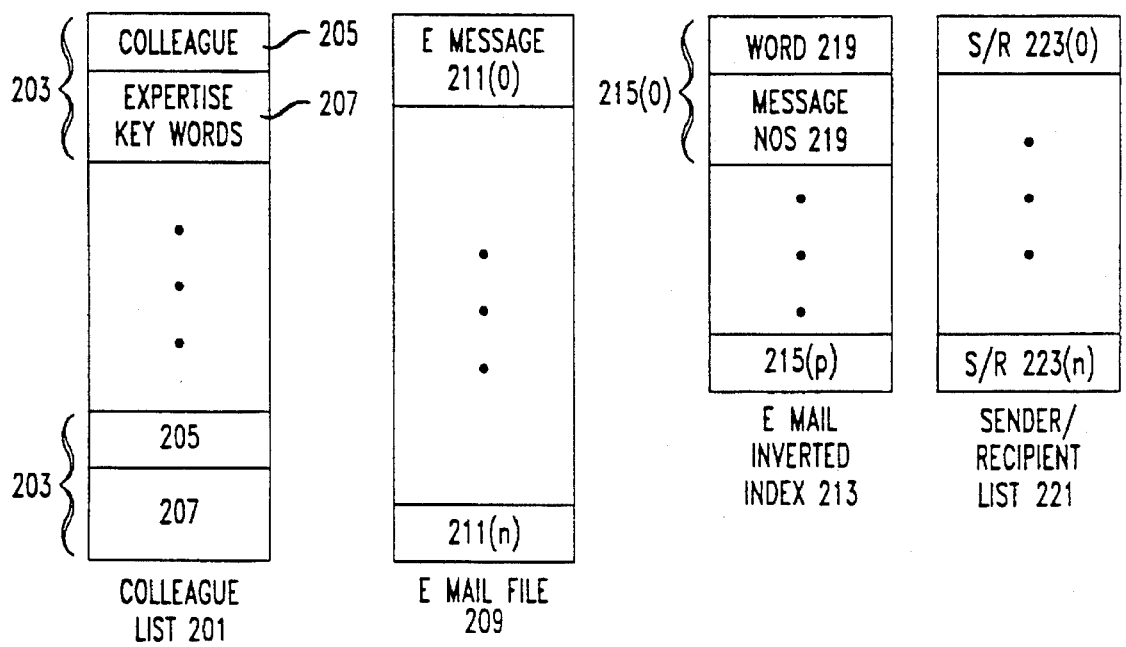
FIG. 2 is a diagram of user model 113 in a preferred embodiment.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description begins with an overview of the invention and then describes in detail how the invention is implemented in apparatus to locate expertise in an e-mail system.

Figure 1:
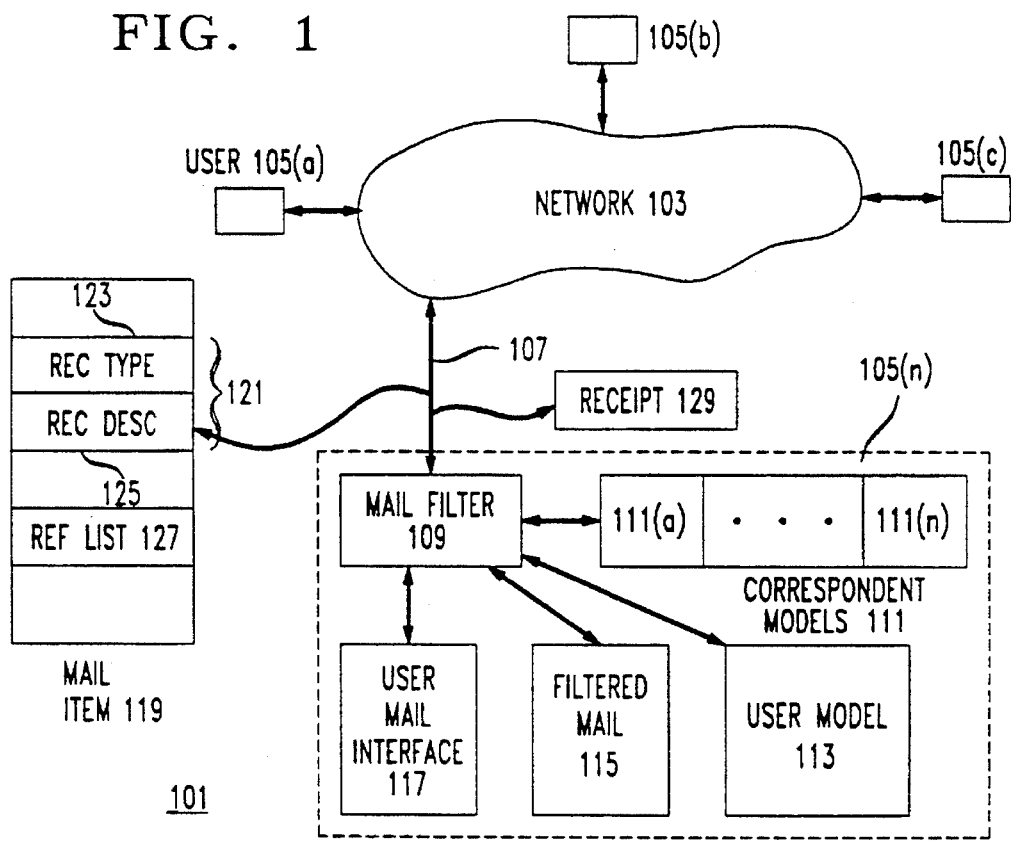
FIG. 1 is a high-level block diagram of apparatus embodying the invention.

Overview of the Invention: FIG. 1

FIG. 1 shows a high-level overview of apparatus 101 which embodies the invention. Apparatus 101 is employed in a network 103 which connects a number of users 105(*a . . . n*). Network 103 may be a network such as Internet or a commercial e-mail network, or it may be an e-mail system which communicates between users of a single computer system. Each user 105 is connected to network 103 by means of a link 107 over which user 105 can send and receive e-mail messages. A mail item of the type used in the invention is shown at 119; mail item 119 is a standard e-mail message except for two additional components:

1. recipient specifier 121 which uses non-address information to further describe the recipients who should receive the e-mail; and 2. referral list 127, which is a list of potential recipients who passed the e-mail on and of recipients to whom the e-mail was provided.

Recipient specifier 121 has two parts, recipient type field 123, which generally indicates how recipient specifier 121 is to be interpreted, and recipient description 125, which contains the non-address information which is actually used to determine whether mail item 119 is to be provided to a given recipient.

A user 105 who wishes to reduce the amount of junk e-mail he receives has a mail filter 109 as part of his e-mail system. When an e-mail item 119 is sent to user 105's address, mail filter 109 interprets recipient specifier 121 to determine whether mail item 119 is to be provided to user 105(*n*). In interpreting recipient specifier 109, mail filter 109 employs user model 113, which is data that provides a model of user 105(*n*). If recipient description 125 specifies a recipient which is of the same kind as that specified by user model 113, mail filter 109 adds mail item 119 to filtered mail 115 and informs user 105(*n*) via interactive user mail interface 117 that mail has arrived. If user 105(*n*) desires, mail filter 109 can further use the information in referral list 127 to indicate the chain of referrals which resulted in the message being directed to user 105(*n*). In some embodiments, mail filter 109 may also use the information in referral list 127 to send a receipt 129 which identifies the e-mail message, the chain of referrals, and user 105(*n*) to the original sender of mail item 119.

If user model 113 does not specify a recipient which is of the same kind specified by recipient description 125, mail filter 109 looks to correspondent models 111 to determine where to send mail item 119. There is a correspondent model 111(*m*) for each of user 105(*n*)'s frequent correspondents, and like user model 113, each correspondent model 111(*m*) contains data which mail filter 109 can use together with recipient description 125 to determine which of user 105(*n*)'s correspondents should receive mail item 119. Mail filter 109 then adds the names and e-mail addresses of those correspondents to referral list 127 in mail item 119 and forwards mail item 119 to those correspondents. If they in turn have mail filters 109, they will also filter mail item 119 as just described. In a preferred embodiment, user 105(*n*) may specify how much control he desires over forwarding. Forwarding may be completely automatic, or mail filter 109 may present user 105(*n*) with the information from recipient description 125 and a list of the correspondents it has found for forwarding and let user 105(*n*) select which of the correspondents is to receive the forwarded letter.

If user 105(*n*) wishes to send an e-mail message with a recipient specifier 121, user 105(*n*) makes that request of mail filter 109. Mail filter 109 uses interface 117 to obtain information from user 105(*n*) which it uses to make recipient specifier 121. Mail filter 109 then uses recipient specifier 121 with correspondent models 111 in the manner described above to make a list of the correspondents who should receive the message. Depending on the implementation, mail filter 109 may simply send the e-mail message to those correspondents or permit user 105(*n*) to select correspondents from the list. The selected correspondents will of course be placed on referral list 127. In FIG. 1, mail filter 109 and correspondent models 111 and user model 113 are all implemented in the local computer system used by user 105(*n*). Such an implementation is advantageous in that the information in correspondent models 111 and user model 113 remains under the control of user 105(*n*). In other embodiments, however, mail filter 109 may be located at any point in network 103. Indeed, some embodiments may contain only correspondent models 111. For example, a data base of customer information might be used as a correspondent model 111, and mail filter 109 might use recipient description 125 together with the data base of customer information to determine which customers should receive e-mail about a new product or service.

A System for Locating Expertise

The techniques described above are employed in a preferred embodiment to make a system for locating expertise. The following discussion first explains the utility of such a system and then presents two different embodiments.

Using a Computer to Find Information

There are basically two ways of finding something out by using a computer: "ask a program" and "ask a person".

The first covers all ways of accessing information stored online, including the use of traditional database programs; file indexing and retrieval programs such as glimpse (by Udi Manber at University of Arizona) or Apple's Apple-Search; news filtering programs such as Hoover (SandPoint Corp.); and even more simply, the use of tools such as ftp, awk, and text editors to retrieve and view files.

The second, "ask a person", covers ways that a computer can be used as a communication medium between people. Currently the prime examples are electronic mail, including both personal e-mail and mailing lists, and bulletin boards and newsgroups. The growing integration of computers and telephones allows us to also view telephony as a computer-based communication medium. Simple examples of such integration are telephone address book programs that run on a personal or pocket computer and dial numbers for you; more sophisticated is the explosion in the use of computer-based FAX. Today it is hard to even buy a modem that does not have FAX capability, and by far the heaviest use of FAX is for person-to-person communication.

There are inherent problems with both general approaches to obtaining information. It has often been noted that as the world of online information sources expands, the "ask a program" approach suffers from the problem of knowing where to look. For example, the Mosaic system overcomes many of the technical problems in accessing a wide variety of information on the Internet, by automatically handling the low-level details of different communication protocols. It is easy and entertaining to browse through an enormous hypermedia space. However, finding an answer to a specific question using Mosaic tends to be slow and frustrating, and often results in failure. One response to this problem has been the attempt to design systems that incorporate knowledge about the location of information, such as the Information Manifold project (by T. Kirk, A. Levy, and D. Srivastava, of AT&T Bell Labs). However, a deeper problem remains, that no solution based solely on building a better search-engine can address. This is the fact that much valuable information is simply not online, but only exists in people's heads. Furthermore, there are economic, social, and political reasons that much valuable information will never be made publicly accessible on the Internet or any other network. Indeed, part of the value of a piece of information resides in the degree to which it is not easily accessible.

In any large organization, determining who is an expert on a particular topic is a crucial problem. The need for expertise location ranges from informal situations, such as where I might need to find an expert on LaTex macros to help fix a typesetting problem in a paper I'm writing, to formal construction of project teams to meet business needs. The range of expertise specifications may range from the generic ("who knows about logic programming?") to the highly specific ("who knows how to modify the interrupt vector handling microcode in the reboot module of the XZY999 processor?").

Online directories of expertise rarely exist, and when they do, the information that contain is certain to be out of date and incomplete. In fact, expertise needs are potentially so specific that it is simply impossible to determine a comprehensive set of categories in advance. Expertise location is therefore generally an "ask a person" task, with the all the problems associated with that approach outlined above.

Let us consider for a moment how expertise location actually works when it is successful. In a typical case I contact a small set of colleagues whom I think might be familiar with the topic. Because each person knows me personally, they are quite likely to respond. Usually none of them is exactly the person I want; however, they can refer me to someone they know who might be. After following a chain of referrals a few layers deep I finally find the person I want.

Note that in this successful scenario I needed to walk a fine line between contacting too few people (and thus not finding the true expert) and contacting too many (and eventually making a pest of myself). Even in the end I might wonder if I might not have found even a better expert if only I could have cast the net a bit wider. I may have had difficulty bringing to mind those people I do know personally who have some expertise in the desired area. If only all of my colleagues employed endlessly patient assistants that I could have contacted initially, who would have known something about their bosses' areas of expertise, and who could have answered my initial queries without disturbing everyone.

Now let us consider how mail filters could be used to augment the expert location process. Each person's mail filter would create a model of that person's areas of interest. This model would be created automatically by using information retrieval (IR) techniques (such as inverted indexes) on all the documents created and received by the user. The user model could be quite large and detailed, and would be private to the user, that is, not stored in a central database. The mail filter would also create a much more coarse-grained model of my contacts by applying similar techniques to all the electronic mail that I exchange with each person.

When I have an expertise location need, I present the problem to my mail filter as an unstructured text description. Again using IR techniques, my mail filter selects a medium-to-large set of my contacts to whom the query may be relevant. It then broadcasts the query, not to the people themselves, but to their mail filters. Upon receipt of the question, each mail filter checks if its owner's user model does indeed provide a good match. If there is a good match, the mail filter presents my request to its owner. If the owner's model does not match, but the model of one of the owner's contacts does, then the mail filter can ask the owner if it can provide a referral. Finally, if there is no match at all, the query is silently logged and deleted. A great deal of flexibility can be built into each mail filter, depending upon its owner's preferences. For example, I might allow automatic referrals to be given to requests that come from my closest colleagues.

This system provides several benefits over either sending personal e-mail to everyone in order to find an expert or using netnews to find the expert. First, it is largely passive on the part of the recipients—they do not need to be reading netnews and wading through dozens of articles. Second, queries are broadcast in a focused manner to those who are at least somewhat likely to find them of interest. Third, users are shielded from seeing a large number of completely irrelevant messages; each mail filter 109 may process dozens of messages for every one the user sees. Finally, messages that a user does see do not come from "out of the blue", but rather are tagged with a chain of referrals from colleague to colleague.

One reason to believe that the system just described would be useful in practice is that it basically models the manner in which expertise location actually works now (D. Krackhardt and J. R. Hanson, "Informal Networks: The Company Behind the Chart", Harvard Business Review, July-August 1993), while allowing more people to be contacted without causing disruption and disturbance.

Implementation of an Expertise Locator

A presently-preferred embodiment of the expertise locator has been implemented using the network agents described in Coen, et al., *Network Agents*, U.S. patent application Ser. No. 08/203,147, filed Feb. 28, 1994 abandoned and continued as U.S. Ser. No. 08/513,417, filed Aug. 10, 1995. In the implementation, mail filter 109 is a component of a user agent which handles e-mail messages for its user. Mail filters 109 are written in the programming language Visual Basic, and run on a standard personal computer. Interactive user mail interface 117 presents the expertise locator in mail filter 109 to the user as an anthropomorphic "talking head" that appears in a window on the computer screen. All the computers running mail filters 109 are networked (currently using the protocol TCP/IP), and can exchange electronic mail with each other and with any person. A mail filter 109 can also invoke other programs to perform various subtasks.

Each mail filter 109 has access to two sets of data base files. The first set, shown in FIG. 2, implements correspondent models 111; the second set, shown in FIG. 3, implements user model 113. Each of the data base files in the two sets is specific to and owned by the individual user of mail filter 109. It is important to note that we do not assume that these files can be directly accessed by anyone other than the user and mail filter 109.

Correspondent models 111 contains the following five files:

Colleague list 201 which contains entries 203 for some of the user's colleagues. Each entry 203 contains an identification 205 for the colleague and each a list of keywords 207 describing the colleague's areas of expertise.

An Email file 209 which contains all of the email 211(0..n) that the user has sent and received for a substantial period of time: typically, the past year or several years.

An Email inverted index file 213 that has an entry 215 for each word that appears in any email message. Entry 215 contains a word 217 and a list of the numbers of the messages in email file 209 that contain that word. This kind of file can be generated using standard information retrieval algorithms, such as those described in (G. Salton, *Automatic Text Processing,* Addison-Wesley 1989).

A sender/recipient list file 221 that has an entry 223 for each message in email file 209. The entry contains the identifier of the sender of the corresponding message (if other than the user) or the identifier of the recipient of the corresponding message (if sent by the user).

Figure 3:
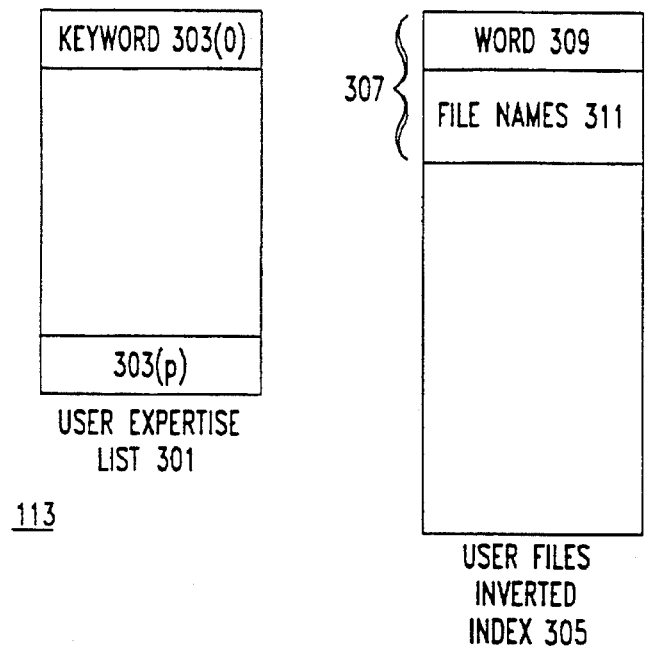
FIG. 3 is a diagram of correspondent models 111 in a preferred embodiment.

FIG. 3 shows the data base files used to implement user model 113.

User expertise list 301 is a file containing a list of keywords that describe some of the user's own areas of expertise.

User files inverted index 305 is a file containing an inverted index of text files in the user's directory. That is, for every word that appears in any file the user has stored on the computer, this file contains a list of the names of the files containing that word.

In the preferred embodiment, colleague list 201 and user expertise list 301 are created by mail filter 109 in interaction with user 105(n); the inverted index files 213 and user files inverted index 305 are created automatically by mail filter 109. This kind of very large inverted index can be quickly created and searched by the program "glimpse" (U. Manber and S. Wu, "GLIMPSE: A Tool to Search Through Entire File Systems," *Usenix Winter* 1994 *Technical Conference,* San Francisco (January 1994), pp. 23–32). In making inverted list 305, GLIMPSE uses a UNIX operating system (UNIX is a trademark of XOPEN) utility which determines whether a file is a text file. In addition, the user can specify to GLIMPSE which directories of files or individual files are to be indexed.

A user begins the process of locating an expert in a topic by clicking on the window for mail filter 109 and typing a phrase that describes the general kind of request (such as, "I need to locate an expert"). Mail filter 109 then prompts the user for a phrase describing the area of expertise. Once this is done, mail filter 109 generates and presents for approval a list of suggested candidates for receiving the request.

The list of candidates is generated by combining names from two sources. First, names are added that appear in colleague list 201, such that the words that appear in the phrase describing the expertise request appear in the list of keywords 207 associated with name 205.

Figure 4:
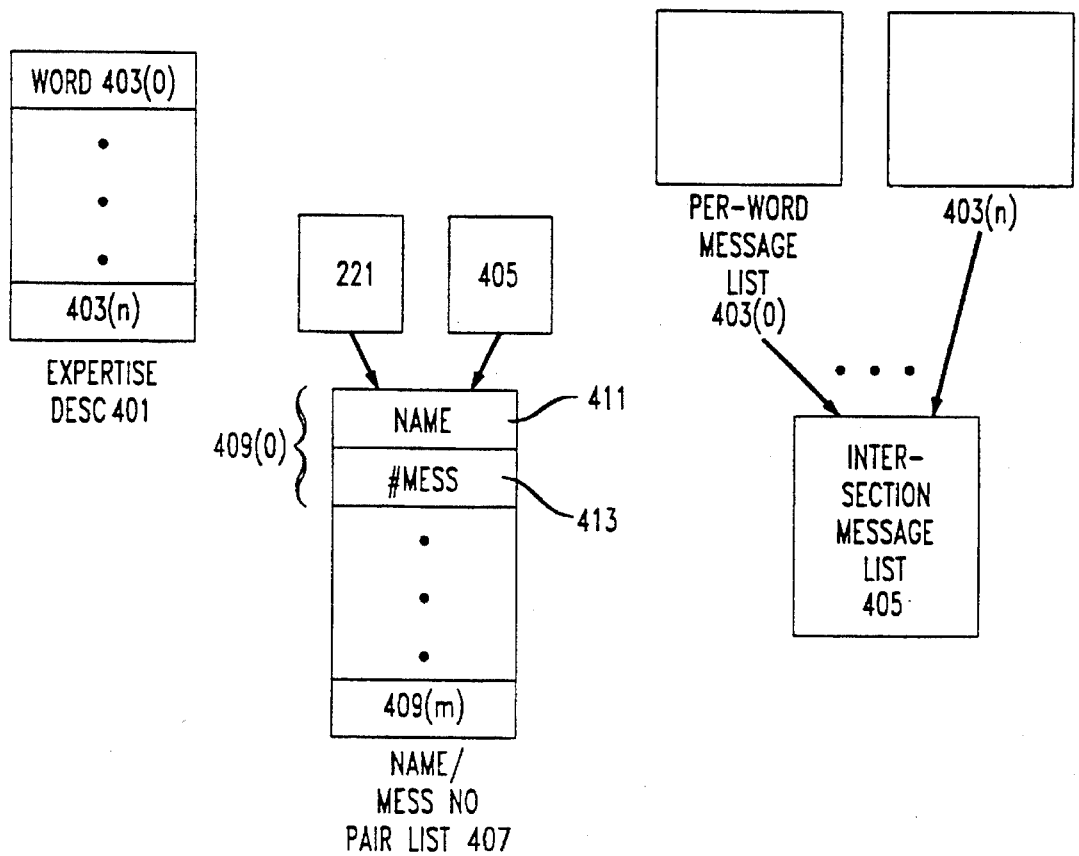
FIG. 4 is a diagram of data structures used by mail filter 109 in a preferred embodiment.

Second, names are added that result from the following computation. First, for each word that appears in the expertise request, mail filter 109 retrieves from email inverted index file 213 a list of messages 403(0 . . . n) (FIG. 4) containing that word. Next, the intersection of the lists is computed, generating a list of messages 405 each of which appears in every one of the previous lists. Next, list of messages 405 is compared against sender/recipient list file 221, and the total number of messages that appear in list of messages 405 that are from each person in sender/recipient list 221 is calculated. The result is a name/message number pair list 407 of pairs of "person name" and "number of messages". Finally, list 407 is sorted according to "number of messages". The 20 names with the highest number of messages in this list are then added to the list of candidates.

After the list of candidates has been approved by the user, mail filter 109 makes a recipient specifier 121 and adds it to the email message. Recipient specifier 121 contains a recipient type request 123 which specifies that an expert is being requested and expertise description 401 is used as recipient description 125.

The message travels through the network and arrives at the computer systems(s) of the recipients. Each recipient mail filter 109 notes recipient specifier 121 specifying that an expert is being requested, removes the e-mail message from the incoming mail stream, and processes it as follows:

First, the words in expertise description 401 contained in the message's recipient specifier 121 are matched against the recipient's user expertise list 301. If the words appear in list 301, then mail filter 109 assumes that this request is appropriate for the recipient to see.

If the words in the phrase do not match against the contents of user expertise list 301, mail filter 109 uses user files inverted index file 305 to match the phrase against the contents of all of the recipient's files which are indexed in file 305. This matching can be efficiently performed using the program "GLIMPSE" mentioned above. If the number of matches is greater then a threshold number (e.g., more than 10 matches), the recipient's mail filter 109 determines that this request is likely to be appropriate for the recipient.

If the recipient's mail filter thus determines in either way that the message is appropriate, it uses user mail interface 117 to make the the message appear on the recipient's computer screen. The recipient is then given the option of (i) responding affirmatively back to the sender; (ii) responding negatively back to the sender; or (iii) referring the request to someone else. If this final option is selected, the recipient's mail filter 109 creates a list of candidate recipients as described above and the process is repeated.

As is apparent from the foregoing description, the preferred embodiment of the expertise locator increases its efficiency by using two-stage correspondent models 111 and user models 113. The first stage is the explicit descriptions of expertise contained in colleague list 201 and user expertise list 301; the second stage is the inverted indexes: inverted index 213 into email file 209 and inverted index 305 into the the user's text files. The algorithms first use the expertise lists 201 and 301, and then they may in addition use the inverted indexes.

EXAMPLE II

Enhanced Yellow Page Service

The general techniques described above can be applied to many different kinds of tasks. The general approach is useful when the following conditions hold:

1. You wish to contact a large number of people, without necessarily broadcasting messages to everyone in the world. In the expertise location example, the user agent helped determine a preliminary list of candidates based on a matching scheme. Other ways of determining whom to send the message to are also useful. In the example below, the recipients are simply taken to be a fixed list of the sender's friends and colleagues.

2. You want the message you send to only be seen by people to whom is it very likely to relevant, in order to avoid being disruptive. To that end,you want the message you send to explicitly indicate the conditions under which which it should be taken to be relevant. Note that the computation of relevancy may rely on information that is private to the recipient. In the previous example, the sender indicated the general conditions of relevancy by recipient type field 123 (thus indicating the general kind of processing to be performed by the recipient's mail filter 109) and the words in recipient description field 125 describing the kind of expertise required (thus providing the parameters to that processing). Another way of saying this is that the sender pro-actively determines the general manner in which the message is to be em filtered. Note that this is different from earlier work on mail filtering, which always assumes that the recipient of a message is completely responsible for establishing the conditions for filtering (if any), and the sender is completely "passive" with regard to filtering.

We illustrate these core points with the following "Enhanced Yellow Page" service. The basic idea is to provide a service that assists people in obtaining one or more personal recommendations about a professional service or business. The system would work as follows.

A customer contacts the Enhanced Yellow Page Service (EYPS) asking for a number of a particular service (e.g., a flower delivery service, an autobody shop, a roofer, etc.). The contact with the EYPS could be made by many possible means of communication, including telephone, an on-line service, an internet Mosaic/HTTP server, or electronic mail; alternatively, the EYPS software and directory could even be distributed to users and run entirely on their personal computers.

The EYPS gives one or more possible numbers. The customer can then ask the EYPS to help in obtaining one or more personal recommendations about the service or business.

To obtain the recommendations, the EYPS first considers people from a list of friends or colleagues of the customer. (One way to obtain this list is by simply asking the customer to register friends, family, or colleagues but there are also less intrusive ways of doing this, such as by keeping track of people with whom the customer frequently communicates.)

Now, the key idea is that the EYPS does not simply contact every person on the list, but rather only contacts those people that have dealt with the particular service or business number in the last couple of months. There are at least two ways in which this kind of "sender pro-active filtering" can be done:

1. The EYPS contacts mail filter 109 for each friend or colleague, indicating the name and telephone number for the service for which a recommendation is desired. Mail filters 109 that have been trusted with their owner's telephone records and/or records of business transactions can determine whether their owner has dealt with that company. If so, they pass the request on to the owner.

2. If the EYPS has direct access to the telephone records of the friends and colleagues (which is the case if the EYPS is implemented by a program running in a long-distance network itself), then it checks the phone records itself to determine the list friends and colleagues that have called that company.

Thus, instead bothering a large group of people, there is a careful screening to ensure that only those are contacted who have had some recent dealings with the particular service or business. There are various ways of how the EYPS can complete the process. The least intrusive way would be to simply leave a message with some of the selected people saying "Mr. or Ms. X would be interested in any opinion or recommendation about service Y. Please contact X at or leave message at number Z. This request expires at midnight".

Note that this kind of "pro-active" mail filtering can also be implemented by having the user send a message directly to someone's mail filter 109. The message header would include a directive saying "pass on to user if he or she has contacted service X at least twice in the last three months." Upon receipt of the message, mail filter 109 will now filter the message based on the included directive. Again, note the difference with the current forms of mail-filtering, where filtering is under complete control of the recipient, and the sender does not give direct instructions to the filtering program.

Such a system naturally raises many privacy issues that can be addressed. For example, you may not necessarily let the person seeking the recommendation know who gets the request-for-advice message. That way, people would not feel obliged to respond. Also, the identify of the requester could be protected by simply having a message saying "A friend would like an opinion or recommendation about service Y." In that case the EYPS would only reveal the identity of the requester once the recipient agrees to respond.

Conclusion

The foregoing Detailed Description has disclosed to those skilled in the computer and networking arts how non-address recipient information in an e-mail message and a mail filter which includes a model of the recipient may be used to reduce the amount of junk e-mail received by the recipient and how the non-address recipient information and a mail filter which includes models of the sender's correspondents may be used to reduce the amount of e-mail sent by a user. The Detailed Description has further disclosed how the above techniques may be used to construct an expertise locator and has disclosed the best mode presently known to the inventors for implementing the expertise locator.

It will be immediately apparent to those skilled in the computer and networking arts that the principles of the invention may be used in any situation where a mail filter has access to information which enables it to respond to non-address information about the potential recipients of an e-mail message. It will be further apparent that many techniques may be used to construct models of the correspondents and recipients for use by the mail filters. The models may be simple lists of keywords, they may be inverted files, they may be data bases, or they may be any other arrangement of data which permits the mail filter to determine from the model and the non-address information whether the potential recipient should actually receive the message. It will further be apparent to those skilled in the art that the location of the mail filter in the network is a matter of design choice. Filters which are located on the same computer system as the recipient have better access to recipient information, while those which are located closer to the sender are more efficient at reducing the total amount of network traffic.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. Apparatus for automatically limiting the recipients of a message sent via a mail system implemented in a computer system, the apparatus comprising:

recipient specifying means in the message which uses non-address information to specify the recipients of the message;

message filtering means in the computer system having access to recipient information contained therein about at least one potential recipient and including means responsive to the non-address information and to the recipient information for providing the message to the at least one potential recipient if the non-address information and the recipient information together indicate that the at least one potential recipient is to receive the message; and means, in the message filtering means, for sending a referral message to a source of the message when the message filtering means provides the message to the at least one potential recipient.

2. The apparatus set forth in claim 1 wherein:

the referral message contains an identification of the at least one potential receipient.

3. The apparatus set forth in claim 1 wherein:

the message is received by a plurality of users;

the message includes information specifying the users who received the message; and the referral message further contains the information specifying the users who received the message.

4. An arrangement for locating expertise in a messaging system implemented in a computer system, comprising:

first means, included in a message, for indicating, via non-address information, expertise sought by a sender of the message;

second means in the computer system, for determining expertise of an addressee of the message;

third means in the computer system responsive to receipt of the message, for determining whether the expertise indicated by the first means matches the expertise of the addressee determined by the second means;

fourth means in the computer system responsive to a determination by the third means that the indicated expertise matches the determined expertise, for providing the message to the addressee, and responsive to a determination by the. third means that the indicated expertise does not match the determined expertise, for preventing the message from being provided to the addressee;

fifth means in the computer system, for determining expertise of contacts of the addressee;

sixth means responsive to a determination that the indicated expertise does not match the determined expertise of the addressee, for determining whether the indicated expertise matches the expertise of any said contacts determined by the fifth means; and seventh means responsive to a determination by the sixth means that the indicated expertise matches the determined expertise of a contact, for sending the message to that contact.

5. The arrangement of claim 4 wherein:

the second, third, and fourth means are associated with the addressee.

6. The arrangement of claim 4 wherein:

the fifth and sixth means are associated with the addressee.

7. The arrangement of claim 4 further comprising:

eighth means responsive to a determination by the sixth means that the indicated expertise does not match the determined expertise of any contact, for discarding the message.

8. The arrangement of claim 7 wherein:

the eighth means are associated with the addressee.

9. The arrangement of claim 4 wherein:

the fifth means comprise means for analyzing messages exchanged by the sender with the contacts to determine therefrom the expertise of the contacts.

10. The arrangement of claim 4 further comprising:

eighth means in the computer system responsive to the sixth means determining that the indicated expertise matches the determined expertise of a contact, for including referral information in the message to indicate that the message is being sent from the addressee to that contact.

11. The arrangement of claim 4 wherein:

the first means comprise means for conveying a list of keywords.

12. An arrangement for locating expertise in a messaging system implemented in a computer system, comprising:

first means, included in a message, for indicating, via non-address information, expertise sought by a sender of the message;

second means in the computer system, for analyzing files of an addressess of the message to determine therefrom expertise of the addressee;

third means in the computer system responsive to receipt of the message, for determining whether the expertise indicated by the first means matches the expertise of the addressee determined by the second means; and fourth means in the computer system responsive to a determination by the third means that the indicated expertise matches the determined expertise, for providing the message to the addressee, and responsive to a determination by the third means that the indicated expertise does not match the determined expertise, for preventing the message from being provided to the addressee.

13. An arrangement for locating expertise in a messaging system implemented in a computer system, comprising:

first means, included in a message, for indicating, via non-address information, expertise sought by a sender of the message;

second means in the computer system, for determining expertise of an addressee of the message;

third means in the computer system responsive to receipt of the message, for determining whether the expertise indicated by the first means matches the expertise of the addressee determined by the second means;

fourth means is in the computer system responsive to a determination by the third means that the indicated expertise matches the determined expertise, for providing the message to the addressee, and responsive to a determination by the third means that the indicated expertise does not match the determined expertise, for preventing the message from being provided to the addressee;

fifth means in the computer system for analyzing messages exchanged by the sender with potential recipients of the message to determine therefrom the expertise of the potential recipients; and sixth means in the computer system responsive to generation of the message by the sender, for selecting addressees of the message from the potential recipients by matching the expertise sought by the sender with the expertise of the potential recipients determined by the fifth means.

14. The arrangement of claim 13 further comprising:

messaging means for sending the message to the selected addressees of the message.

15. The arrangement of claim 13 wherein:

the fifth and sixth means are associated with the sender.

16. An arrangement for locating expertise in a messaging system implemented in a computer system, comprising:

first means, included in a message, for indicating, via non-address information, expertise sought by a sender of the message;

second means in the computer system, for determining expertise of an addressee of the message;

third means in the computer system responsive to receipt of the message, for determining whether the expertise indicated by the first means matches the expertise of the addressee determined by the second means;

fourth means in the computer system responsive to a determination by the third means that the indicated expertise matches the determined expertise, for providing the message to the addressee, and responsive to a determination by the third means that the indicated expertise does not match the determined expertise, for preventing the message from being provided to the addressee; and fifth means in the computer system responsive to the fourth means providing the message to the addressee, for sending a referral message to the sender to inform the sender that the message was provided to the addressee.

* * * * *